US 6,652,820 B2

(12) United States Patent
Bakke

(10) Patent No.: US 6,652,820 B2
(45) Date of Patent: Nov. 25, 2003

(54) METHODS OF MAKING CESIUM SALTS AND OTHER ALKALI METAL SALTS

(75) Inventor: Bart F. Bakke, Manitoba (CA)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/824,623

(22) Filed: Apr. 2, 2001

(65) Prior Publication Data

US 2002/0143209 A1 Oct. 3, 2002

(51) Int. Cl.$^7$ .......................... C01D 17/00; C01F 11/00
(52) U.S. Cl. ..................... 423/179; 423/208; 423/395; 423/499.1; 423/551; 423/642; 423/421; 423/499.3; 423/499.4; 562/579; 562/582; 562/584; 562/585; 562/589; 562/590; 562/597; 562/598; 562/601; 562/606; 562/607; 562/609
(58) Field of Search .................. 423/179, 208, 423/395, 499.1, 551, 642, 421, 499.3, 499.4; 562/590, 607, 609, 579, 582, 584, 585, 589, 597, 601, 598, 606

(56) References Cited

U.S. PATENT DOCUMENTS

| | | | | |
|---|---|---|---|---|
| 2,383,247 A | * | 8/1945 | Gardner | 423/428 |
| 3,207,571 A | | 9/1965 | Berthold | |
| 3,489,509 A | | 1/1970 | Johnson | |
| 4,597,955 A | | 7/1986 | Mein | 423/184 |
| 5,034,094 A | * | 7/1991 | Kurple | 162/16 |
| 5,605,669 A | | 2/1997 | Hofmann et al. | 423/208 |
| 6,015,535 A | | 1/2000 | Brown et al. | 423/179 |

FOREIGN PATENT DOCUMENTS

| | | | |
|---|---|---|---|
| DE | 38 01 382 A1 | | 8/1989 |
| JP | 46-20890 | * | 6/1971 |
| JP | 48-14317 | * | 5/1973 |
| WO | WO 96/31435 | | 10/1996 |
| WO | 96/35657 | * | 11/1996 |

OTHER PUBLICATIONS

Translation of DE 3801382, Aug. 1989.*
International Search Report for PCT/US02/10063 dated Sep. 5, 2002.
110:234090 w, 6001 *Chemical Abstracts*, p. 110, (Jun. 1989), No. 26, Columbus, Ohio, US.

* cited by examiner

*Primary Examiner*—Steven Bos

(57) ABSTRACT

A method of making a cesium salt is described and involves reacting a cesium sulfate containing solution with lime to form 1) a solution containing at least cesium hydroxide and 2) a residue comprising calcium sulfate. The method further involves removing the residue from the solution and converting the cesium hydroxide that is present in the solution to at least one type of cesium salt. The present invention further relates to uses of the cesium salt as well as methods of making cesium hydroxide using lime. Also, methods of making alkali metal salts and alkali metal hydroxides are also described.

43 Claims, No Drawings

METHODS OF MAKING CESIUM SALTS AND OTHER ALKALI METAL SALTS

BACKGROUND OF THE INVENTION

The present invention relates to cesium salts and other alkali metal salts and methods of making the same.

Cesium salts, such as cesium formate, are increasingly being discovered as useful additives for a variety of industrial applications such as in the hydrocarbon recovery areas. Accordingly, there is a desire to develop processes which produce relatively high purity cesium salts efficiently and economically.

Previously, barium hydroxide and soluble barium salts have been used as reactants with cesium sulfate solutions in the formation of cesium salts. However, barium compounds are very expensive reactants and therefore undesirable.

Other processes have attempted to avoid the use of barium compounds and use cesium-aluminum-alum which is reacted in the presence of water with calcium hydroxide and a water soluble calcium salt. However, such a process requires the use of a soluble acid salt of lime, like calcium formate, and doesn't address the removal of many impurities that exist in the cesium salt solution that is formed. There is also the very real risk of having soluble calcium salt contamination in the resultant product if the exact stoichiometric amount required is only slightly exceeded.

Accordingly, there is a need to develop improved processes for making cesium salts and other alkali metal salts which avoid one or more of the above-described disadvantages.

SUMMARY OF THE PRESENT INVENTION

A feature of the present invention is to provide a method of making cesium salt and other alkali metal salts which avoids the exclusive use of expensive barium compounds.

Another feature of the present invention is to provide a method of making cesium salt which uses cesium sulfate as one of the starting reactants.

An additional feature of the present invention is to provide a process which forms relatively high purity cesium salts without large amounts of impurities.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a methods of making a cesium salt. In the methods, a cesium sulfate containing solution is reacted with lime to form a solution containing at least cesium hydroxide; and also formed is a residue containing calcium sulfate. The residue is then removed from the solution. The cesium hydroxide in the solution is then converted to at least one cesium salt. These steps can be repeated one or more times with the solution resulting in the last step in order to convert any remaining cesium sulfate, if desired, that remains in the solution.

The present invention further relates to a method of making cesium formate. In this method, a cesium sulfate containing solution is reacted with lime to form a solution containing cesium hydroxide and a residue containing calcium sulfate is also formed. The residue is removed from the solution. Afterwards, the cesium hydroxide in the solution is converted to cesium formate by the introduction of formic acid.

Furthermore, the present invention relates to a method of making cesium hydroxide which involves reacting a cesium sulfate containing solution with lime to form a solution containing at least cesium hydroxide and a residue containing calcium sulfate is also formed. The residue is then removed from the solution containing the cesium hydroxide.

Also, the present invention relates to a method of making an alkali metal salt comprising: a) reacting an alkali metal sulfate containing solution with lime to form 1) a solution comprising at least alkali metal hydroxide and 2) a residue comprising calcium sulfate; b) removing the residue from the solution; and c) converting the alkali metal sulfate hydroxide in the solution to at least one type of alkali metal salt.

In addition, the present invention relates to a method of making alkali metal hydroxide comprising: a) reacting an alkali metal sulfate containing solution with lime to form 1) a solution comprising at least alkali metal hydroxide and 2) a residue comprising calcium sulfate; and b) removing the residue from the solution.

The present invention also relates to a method of purifying alkali metal sulfate comprising: a) reacting an alkali metal sulfate containing solution with lime to form 1) a solution comprising at least alkali metal hydroxide and 2) a residue comprising calcium sulfate; b) removing the residue from the solution; and c) converting the alkali metal hydroxide in the solution to alkali metal sulfate, wherein the alkali metal sulfate in step c) has a purity higher than the alkali metal sulfate in step a).

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to a method of making a cesium salt and further relates to a method of making cesium hydroxide. The present invention, in addition, relates to methods of making alkali metal salts and alkali metal hydroxides.

In the preferred method of making cesium salts, a cesium sulfate containing solution is reacted with lime to form a solution comprising at least cesium hydroxide. A residue comprising calcium sulfate is also formed in the reaction, which is typically in the form of a precipitate. The residue comprising calcium sulfate is then removed from the solution and the cesium hydroxide in the solution is converted to at least one cesium salt.

The reacting of the cesium sulfate containing solution with the lime can occur at essentially any temperature and preferably occurs at a temperature of from about 0° C. to about 100° C., and more preferably occurs at a temperature of from about 0° C. to about 50° C., and even more preferably occurs at a temperature of from about 0° C. to about 30° C. Lower reaction temperatures are preferred in the present invention since the solubility of lime is significantly higher at lower temperatures. For instance, the lime solubility in the cesium sulfate containing solution is twice as high at about 20° C. to about 25° C. as compared to the lime solubility at 95° C.

The cesium sulfate containing solution or slurry is typically an aqueous solution which contains any soluble amount of cesium sulfate in solution. For purposes of the present invention, suspended solids can be present in the solution. For instance, from about 0 ppm to about 3000 ppm of suspended solids can be present in the solution. Preferably, the suspended solids are not potentially soluble calcium salts. Thus, for purposes of the present invention, the cesium sulfate containing solution can also be considered a slurry. Preferably, from about 1% to about 50% by weight of cesium sulfate is present in the cesium sulfate containing solution, and more preferably from about 1% to about 10% by weight, and even more preferably about 5% by weight cesium sulfate in the cesium sulfate containing solution. The cesium sulfate can be obtained from a variety of sources including, but not limited to, filtration of neutralized cesium alum derived from pollucite ore digestions, filtration of neutralized cesium alums intentionally formed when recycling various cesium salt scraps, reprocessing to cesium sulfate salt from spent catalysts, and the like. Extremely pure or impure cesium sulfate solutions can be converted to the desired cesium salt.

The lime used to react with the cesium sulfate containing solution can be any type of lime and is preferably a calcium oxide or is a calcium hydroxide (also known as a hydrated lime). If calcium oxide is used, typically this lime forms a calcium hydroxide upon being combined with water or when introduced into the solution containing the cesium sulfate. The amount of lime added in the reaction with the cesium sulfate containing solution can be any amount and preferably is an amount sufficient to raise the pH of the overall solution to a pH of about 12.5 to about 13.5, and preferably to as high a pH as possible. Adding calcium oxide straight into the cesium sulfate solution can be done for purposes of the present invention. The preferred source is either a slaked lime slurry before addition to the cesium sulfate, or addition of dry hydrated lime.

Generally, with a solution containing cesium sulfate and the maximum addition of lime required to fully react with the cesium sulfate containing solution, from about 8% to about 25% by weight of the originally contained cesium sulfate can be converted to cesium hydroxide. These values are based on the originally contained cesium sulfate in solution after removal of the residue containing the calcium sulfate. The residue may also contain strontium, magnesium, calcium, barium, and/or metallic impurities or other impurities. The residue can be removed by any standard technique for removing precipitates including, but not limited to, filtration and the like.

Once the residue is removed, the remaining solution contains the converted cesium hydroxide as well as any remaining soluble cesium sulfate in solution. There typically is cesium sulfate remaining in the solution since from about 8% to about 25% of the originally contained cesium sulfate by weight is converted to cesium hydroxide after each run. Once the residue is removed, the cesium hydroxide in the solution can then be converted to at least one type of cesium salt. The preferred manner of converting the cesium hydroxide is with the use of an appropriate acid. For instance, if the desired cesium salt is cesium formate, formic acid is used to neutralize the cesium hydroxide that has been generated and that is present in solution. The formic acid causes the formation of soluble cesium formate. Other cesium salts that can be formed by the process of the present invention include, but are not limited to, cesium acetate, cesium citrate, cesium chloride, cesium bromide, cesium nitrate, cesium iodide, cesium propionate, cesium oxalate, cesium butyrates, cesium salicylate, or improved purity cesium sulfate. The appropriate acid is used to form each of these cesium salts, such as acetic acid for cesium acetate. Other acids include citric, hydrochloric, hydrobromic, hydroiodic, nitric, butyric, propionic, oxalic and salicylic.

As indicated earlier, the above-described process can be repeated any number of times until the cesium sulfate in solution is nearly exhausted or totally exhausted. Accordingly, after the first run as described above, the cesium hydroxide has been converted to a cesium salt and thus the solution contains the soluble cesium salt and the remaining cesium sulfate in solution. This solution is preferably then combined with additional lime to form a solution containing at least cesium hydroxide, the previously formed cesium salt, and any remaining soluble cesium sulfate along with the formation of additional residue containing calcium sulfate. The residue is then removed in the same manner as described previously. The cesium hydroxide then is converted to a cesium salt, which can be the same or different from the first cesium salt formed. Preferably, the same cesium salt is formed through the repetition of the process steps described earlier. This process can be repeated as many times and preferably until the cesium sulfate is exhausted or nearly exhausted. The acid and/or lime used after each sequence of repeated steps can be the same or different.

In one embodiment, preferably not all of the cesium hydroxide is converted to or is not immediately converted to a cesium salt since the cesium hydroxide maintains the overall solution containing the cesium salt at a higher pH which enhances the removal of many impurities including, but not limited to, the divalent cations of calcium, barium, magnesium, strontium and metallic impurities like iron, nickel, chromium, manganese, and silicon. The lime has the capability to precipitate metallic impurities out of the cesium sulfate solution. The metallic impurities cited above are commonly precipitated by the elevation of pH. Additionally, while pH alone may not always precipitate the divalent cations, the elevation in pH, consistent with those achieved by this process, is sufficiently high that when followed by the introduction of at least one soluble carbonate source, like carbon dioxide, the divalent cations preferably precipitate as insoluble carbonates and/or other impurities. Other examples of a soluble carbonate source include, but are not limited to, carbonates and/or bicarbonates of cesium, rubidium, potassium, sodium, and lithium or combinations thereof.

With respect to the acid used to preferably convert the cesium hydroxide to the desired cesium salt, the amount of acid added is sufficient to convert up to all of the cesium hydroxide to the desired cesium salt. Preferably, up to, and no more than, a stoichiometric amount of acid needed to convert the cesium hydroxide to the desired cesium salt is added. Generally, when the cesium hydroxide has been fully converted to the cesium salt, the solution containing the soluble cesium salt and any remaining cesium sulfate in solution has a pH typically of from about 7 to about 9; in other words, the solution is substantially neutralized.

The present invention can be further described by the following preferred reaction scheme which is just one example:

STEP 1: First lime addition to neutral 5% cesium sulfate solution.

Reaction 1: $Cs_2SO_4 + Ca(OH)_2 \rightarrow 2CsOH + CaSO_4\downarrow$ (8–25% conversion of originally contained $Cs_2SO_4 \rightarrow CsOH$)

Reaction 2: $MgSO_4 + Ca(OH)_2 \rightarrow Mg(OH)_2\downarrow + CaSO_4\downarrow$.

STEP 2: Filtration of precipitated $CaSO_4$ & $Mg(OH)_2$ solids from $CaSO_4$ saturated cesium liquor.

STEP 3: Neutralization of CsOH contained in the clear filtrate with a desired acid like formic acid.

Reaction: $CsOH + HCOOH \rightarrow CsCOOH + H_2O$ No Precipitate.

STEP 4: Repeat step 1 with 2nd lime addition to neutralized filtrate containing cesium sulfate and formate Reaction: $Cs_2SO_4 + Ca(OH)_2 \rightarrow 2CsOH + CaSO_4\downarrow$ (Another 8–25% conversion of originally contained $Cs_2SO_4 \rightarrow CsOH$)

STEP 5: Filtration to separate precipitated $CaSO_4$ solids from $CaSO_4$ saturated cesium liquor.

STEP 6: Neutralization of CsOH contained in the clear filtrate with a desired acid like formic acid.

Reaction: $CsOH + HCOOH \rightarrow CsCOOH + H_2O$ No Precipitate.

STEP 7: Repeat step 1 with 3rd lime addition to neutralized filtrate containing cesium sulfate and formate.

Reaction: $Cs_2SO_4 + Ca(OH)_2 \rightarrow 2CsOH + CaSO_4\downarrow$ (Another 8–25% conversion of originally contained $Cs_2SO_4 \rightarrow CsOH$)

STEP 8: Filtration to separate precipitated $CaSO_4$ solids from $CaSO_4$ saturated cesium liquor.

STEP 10: Neutralization of CsOH contained in the clear filtrate with a desired acid like formic acid.

Reaction: $CsOH + HCOOH \rightarrow CsCOOH + H_2O$ No Precipitate

Step 11: Repeat steps 7 through 10 until all cesium is converted from sulfate to formate, or until desired.

As indicated earlier, preferably substantially no, and more preferably no soluble calcium hydroxide is present in the calcium sulfate saturated filtrate and preferably the lime has fully converted its maximum amount of cesium sulfate to the cesium hydroxide.

The recovered cesium salt can be used for a variety of uses such as, but not limited to, oil field fluids, catalysts, organic synthesis, specialty glass manufacturing, medical uses and for many other applications known to those skilled in the art.

The present invention, in addition, relates to a method of making cesium hydroxide which can then be subsequently converted to other desirable cesium containing products, wherein the method involves reacting a cesium sulfate containing solution with lime as described above to form a solution containing at least the cesium hydroxide and also to form a residue comprising calcium sulfate. As described above, the residue comprising calcium sulfate can be removed and a solution containing soluble cesium hydroxide is recovered along with any remaining cesium sulfate in solution. The cesium hydroxide can then be converted to any desirable cesium containing product, including cesium sulfate, for instance, by adding the desired acid. This method can also be used, for instance, to purify cesium sulfate solution. The action of elevating the pH by adding lime, producing cesium hydroxide and a residue comprising at least calcium sulfate, and separating the residue from the solution, purifies the solution. A soluble carbonate source can be optionally added when the pH is elevated to further purify the solution, precipitating more impurities. The cesium hydroxide can then be neutralized with sulfuric acid to form a higher purity cesium sulfate solution.

The present invention can also be used with other alkali metals (e.g., lithium, sodium, potassium, rubidium, francium). Thus, the above steps can be modified such that any alkali metal sulfate containing solution is used with lime and then using the above-described steps to form any desired alkali metal containing product (e.g., an alkali metal hydroxide, an alkali metal salt, and/or purified alkali metal sulfates).

The present invention will be further clarified by the following examples, which are intended to be purely exemplary of the present invention.

EXAMPLES

The following examples are provided to depict the improved benefits of the present invention. Each example originates from the identical filtered stock solution of pH neutral and dilute, nominally 6% cesium sulfate solution. It is also noted that in Example 4, formic acid was used as the desired acid, but the process certainly applies to other acids. Example 1 cites the relevant properties of this starting stock solution of untreated cesium sulfate solution.

Example 1

Filtered and pH neutral dilute cesium sulfate solution, approximately 6% by weight, was assayed to assess its relevant properties, including the non-alkali soluble impurity levels. This sample was used in each of the forthcoming examples. Including the g/l cesium, the notable non-alkali soluble impurities at greater than or equal to 1 ppm are depicted as follows:

47 g/l cesium
476 ppm of calcium
2470 ppm of magnesium
57 ppm of manganese
33 ppm of silicon
3 ppm of aluminum
1 ppm of boron
5 ppm of thallium Example 2

Fifteen grams of barium hydroxide monohydrate were added to 250 ml of the stock cesium sulfate solution in Example 1. This quantity removed all of the soluble sulfates that were present by precipitating insoluble barium sulfate. The slurry was filtered to remove the insoluble precipitated residue. The dilute cesium hydroxide filtrate solution was analyzed to contain <10 ppm of sulfate and 370 ppm barium. Adjusting for the slight 1% of excess barium used, the input soluble sulfate in the starting cesium sulfate solution was calculated to contain 28253 ppm of soluble sulfate. This sulfate level and barium hydroxide requirement for this common dilute cesium sulfate stock solution was used as the benchmark for the processing steps used in the examples cited below.

Example 3

Soluble calcium formate salt was added to 250 ml of the stock cesium sulfate solution in an amount consistent with converting the contained soluble alkali sulfates, including cesium, to soluble alkali formates. The equivalent of 6.3 grams of calcium formate was added to the pH neutral cesium sulfate solution. The precipitating residue comprising insoluble calcium sulfate was filtered to remove the insoluble residue from the dilute and neutral pH soluble alkali formate solution. This predominantly cesium formate solution was analyzed to compare and contrast it to the input cesium sulfate solution analyzed above in Example 1 and to the other examples, including Examples 4A and 4B. Including the g/l cesium, the notable non-alkali soluble impurities at greater than or equal to 1 ppm are depicted as follows:
47 g/l cesium
1088 ppm of calcium
2021 ppm of magnesium
25 ppm of manganese
46 ppm of silicon
347 ppm of aluminum
1 ppm boron
2 ppm iron
1 ppm strontium
2 ppm phosphorous
4 ppm of thallium
12646 ppm sulfate Example 4A To 500 ml of 12 deg C. stock cesium sulfate solution were added 6.4 grams of calcium hydroxide, achieving a maximum solution pH of 13.26. The solution was filtered, recovering 465 ml of filtrate with a pH of 13.21. The solution was re-filtered the next morning to remove the characteristic surface platelets of calcium carbonate crystals that formed overnight due to both the high pH of the solution and exposure to the atmosphere. The carbonate flakes fully dissolved and effervesced when treated in a minimal volume dilute HCl solution at a pH of 3.2, releasing carbon dioxide as expected. Full dissolution of the flakes indicated a lack of calcium sulfate present.

The solution was neutralized with 2.05 ml of formic acid. No precipitate was formed. The addition of formic acid was consistent with 4500 ppm of alkali sulfate having been converted first to hydroxide and then to formate when neutralized.

The process was repeated a second time using the prior 465 ml of neutralized filtrate except reacting 1.8 grams of calcium hydroxide with the solution at temperature of about 45 deg C. The slurry was filtered at 45 deg C. to separate out the insoluble residue. The solution was allowed to cool overnight. After the surface platelets of calcium carbonate crystals were removed the next day, the solution was again neutralized with formic acid. A total of 1.4 ml was required to neutralize 460 ml of high pH filtrate. No precipitate was formed. The quantity of formic acid used was consistent with 3137 ppm of alkali sulfate having been converted first to hydroxide and then to formate when neutralized.

The process was repeated a third time using 450 ml of the prior neutralized filtrate except reacting 1.7 grams of calcium hydroxide with the solution at a temperature of about 60 deg C. The slurry was filtered at 60 deg C. to separate out the insoluble residue. The solution was allowed to cool overnight. After the surface platelets of calcium carbonate crystals were removed the next day, the solution was again neutralized with formic acid. A total of 0.95 ml was required to neutralize 415 ml of high pH filtrate. No precipitate was formed. The quantity of formic acid used was consistent with 2360 ppm of alkali sulfate having been converted first to hydroxide and then to formate when neutralized.

The process was repeated a fourth time using 415 ml of the prior neutralized filtrate except reacting 1.7 grams of calcium hydroxide with the solution at a temperature of about 60 deg C. The slurry was filtered at 60 deg C. to separate out the insoluble residue. The solution was allowed to cool overnight. After the surface platelets of calcium carbonate crystals were removed the next day, the solution was again neutralized with formic acid. A total of 0.85 ml was required to neutralize 410 ml of high pH filtrate. No precipitate was formed. The quantity of formic acid used was consistent with 2137 ppm of alkali sulfate having been converted first to hydroxide and then to formate when neutralized.

The process was repeated a fifth time using 400 ml of the prior neutralized filtrate except reacting 1.7 grams of calcium hydroxide with the solution at a temperature of about 65 deg C. The slurry was filtered at 65 deg C. to separate out the insoluble residue. The solution was allowed to cool overnight. After the surface platelets of calcium carbonate crystals were removed the next day, the solution was again neutralized with formic acid. A total of 0.8 ml was required to neutralize 320 ml of high pH filtrate. No precipitate was formed. The quantity of formic acid used was consistent with 2577 ppm of alkali sulfate having been converted first to hydroxide and then to formate when neutralized.

The process was repeated a sixth time using 310 ml of the prior neutralized filtrate except reacting 1.5 grams of calcium hydroxide with the solution at temperature of about 95 deg C. Water was added to maintain a constant volume. The slurry was filtered at 90–95 deg C. to separate out the insoluble residue. The solution was allowed to cool. After the surface platelets of calcium carbonate crystals were removed the following two days, the measured solution pH was 12.67. This pH seemed uncharacteristically low even at the 90–95 deg C. reaction temperature suggesting perhaps that the preponderance of the alkali sulfates had already been previously converted. The solution was analyzed to contain 1390 ppm of calcium.

Potassium carbonate was added to precipitate impurities from the liquor, including soluble calcium sulfate as insoluble calcium carbonate. A total of 1.2 grams was reacted with 250 ml of solution. The clear filtrate became instantly cloudy upon addition. The solution was filtered, separating out the insoluble precipitate. The filtrate was neutralized using 0.15 ml of formic acid, indicating only 619 ppm of alkali sulfate had been converted first to hydroxide and then to formate when neutralized. No precipitate was formed. Including the g/l cesium, the notable non-alkali soluble impurities at greater than or equal to 1 ppm are depicted as follows:
51 g/l cesium
19 ppm of calcium
1 ppm of boron
2 ppm of thallium
3962 ppm of sulfate Example 4B To 500 ml of 10 deg C. stock cesium sulfate solution were added 6.4 grams of calcium hydroxide. The slurry was allowed to react for 30 minutes. One additional gram was then added to the slurry to account for any calcium carbonate that may have formed due to the high pH and atmospheric agitation. An additional 10 minutes were allowed for reaction. The slurry pH prior to filtration was 13.42. The filtrate pH was 13.33. The solution was immediately neutralized with formic acid. No precipitate was formed. The 480 ml of recovered filtrate required 2.3 ml to neutralize. The addition of formic acid was consistent with 4940 ppm of alkali sulfate having been converted first to hydroxide and then to formate when neutralized.

To the neutralized filtrate were added 1.9 grams of calcium hydroxide. The solution temperature was gradually increased to about 50 deg C. over 30 minutes. An additional 0.6 grams of calcium hydroxide were then added, again to account for any potential lime conversion to insoluble calcium carbonate. An additional 10 minutes were allowed for any further reaction at 50 deg C. The solution was filtered hot and allowed to cool to room temperature before proceeding with neutralization with formic acid.

Upon cooling to room temperature, a very light presence of surface platelets of calcium carbonate crystals was observed to have formed, as expected. They were removed by filtration just prior to neutralization to ensure that it could be observed that no precipitate was formed during neutralization. The 457 ml of filtrate was neutralized with 1.45 ml of formic acid. No precipitate was formed. The addition of formic acid was consistent with 3302 ppm of alkali sulfate having been converted first to hydroxide and then to formate when neutralized.

The neutralized solution was allowed to sit overnight to observe if any precipitate formed. The liquor remained pristine clear as observed the following day.

To 450 ml of neutralized filtrate were added 1.8 grams of calcium hydroxide. The solution temperature was gradually increased to 50 deg C. over 30 minutes. An additional 0.6 grams of calcium hydroxide were then added, again to account for any potential lime conversion to insoluble calcium carbonate. An additional 10 minutes were allowed for any further reaction at 50 deg C. The solution was filtered and allowed to cool to room temperature before proceeding with neutralization with formic acid.

Upon cooling to room temperature, a very light presence of surface platelets of calcium carbonate crystals was observed to have formed, as expected. They were removed by filtration just prior to neutralization to ensure that it could be observed that no precipitate was formed during neutralization. The 433 ml of filtrate was neutralized with 1.2 ml of formic acid. No precipitate was formed. The addition of formic acid was consistent with 2884 ppm of alkali sulfate having been converted first to hydroxide and then to formate when neutralized.

To the neutralized filtrate were added 1.7 grams of calcium hydroxide. The solution temperature was gradually increased to 55 deg C. over 30 minutes. An additional 0.6 grams of calcium hydroxide were then added, again to account for any potential lime conversion to insoluble calcium carbonate. An additional 10 minutes were allowed for any further reaction at 55 deg C. The solution was filtered and allowed to cool to room temperature before proceeding with neutralization with formic acid.

Upon cooling to room temperature, a very light presence of surface platelets of calcium carbonate crystals was observed to have formed, as expected. They were removed by filtration just prior to neutralization to ensure that it could be observed that no precipitate was formed during neutralization. The 416 ml of filtrate was neutralized with 1.0 ml of formic acid. No precipitate was formed. The addition of formic acid was consistent with 2490 ppm of alkali sulfate having been converted first to hydroxide and then to formate when neutralized.

The neutralized liquor sat for two days before proceeding further. The liquor was observed to remain pristine clear after these two days.

To 388 ml of neutralized filtrate were added 1.5 grams of calcium hydroxide. The solution temperature was gradually increased to 65 deg C. over 30 minutes. An additional 0.5 grams of calcium hydroxide were then added, again to account for any potential lime conversion to insoluble calcium carbonate. An additional 10 minutes were allowed for any further reaction at 65 deg C. The solution was filtered and allowed to cool to room temperature before proceeding with neutralization with formic acid.

Upon cooling to room temperature, a very light presence of surface platelets of calcium carbonate crystals was observed to have formed, as expected. They were removed by filtration just prior to neutralization to ensure that it could be observed that no precipitate was formed during neutralization. A total of 377 ml of filtrate was neutralized with 0.73 ml of formic acid. No precipitate was formed. The addition of formic acid was consistent with 2015 ppm of alkali sulfate having been converted first to hydroxide and then to formate when neutralized.

The neutralized liquor sat for four days before proceeding further. The liquor was observed to remain pristine clear after these four days.

To 350 ml of the neutralized filtrate were added 1.4 grams of calcium hydroxide. The solution temperature was gradually increased to 80–85 deg C. over 30 minutes. An additional 0.5 grams of calcium hydroxide were then added, again to account for any potential lime conversion to insoluble calcium carbonate. An additional 10 minutes were allowed for any further reaction at 80–85 deg C. The solution was filtered and allowed to cool to room temperature before proceeding.

Potassium carbonate was added to 323 ml of pH 12.87 filtrate to precipitate impurities including soluble calcium sulfate as insoluble calcium carbonate. An amount believed slightly in excess was added to account for other soluble impurities that could be favorably removed as insoluble precipitates. A total of 1.9 grams was added. The clear filtrate became instantly cloudy upon addition. Thirty minutes of reaction time were allowed. The solution was filtered, separating out the insoluble precipitate.

The filtrate was neutralized with formic acid. A total of 0.5 ml of formic acid was required to neutralize 306 ml of filtrate. Again, there was no precipitate upon neutralization. The addition of formic acid was consistent with 1700 ppm of alkali sulfate having been converted first to hydroxide and then to formate when neutralized. Including the g/l cesium, the notable non-alkali soluble impurities at greater than or equal to 1 ppm are depicted as follows:

52 g/l cesium
2 ppm of calcium
2 ppm of phosphorous
1 ppm of thallium
4069 ppm of sulfate Example 5A Calcium hydroxide was added to 250 ml of 15 deg C. stock cesium sulfate solution analyzed in Example 1. A total of 3.2 grams of calcium hydroxide was added. The slurry pH was 13.30. The insoluble residue was separated from the reaction slurry by filtration, recovering a dilute filtrate of soluble cesium sulfate and cesium hydroxide. The pH of the 220 ml of recovered filtrate was 13.20.

Added to this filtrate were 0.8 grams of potassium carbonate, a soluble carbonate source intended to precipitate impurities including soluble calcium sulfate as insoluble calcium carbonate at the elevated pH. The resultant cloudy solution was then filtered to separate the residue comprising at least calcium carbonate from the purified filtrate. A total of 210 ml of filtrate was recovered.

The 210 ml of recovered filtrate was then neutralized with sulfuric acid to a neutral pH, requiring 0.55 ml of sulfuric acid. No precipitate was formed. The calculated alkali hydroxide from the neutralization indicated that 4300 ppm of the input alkali sulfate had been converted to alkali hydroxide. Analysis of the cesium sulfate solution indicated that the 0.8 grams of potassium carbonate added to the solution above were slightly deficient to precipitate all of the relevant impurities, like soluble calcium sulfate as insoluble calcium carbonate. Including the g/l cesium, the notable non-alkali soluble impurities at greater than or equal to 1 ppm are depicted as follows:
53 g/l cesium
122 ppm of calcium
22 ppm of magnesium
1 ppm of silicon
31 ppm aluminum
1 ppm of boron
3 ppm of phosphorous
2 ppm of thallium Example 5B Calcium hydroxide was added to 250 ml of 90–95 deg C. stock cesium sulfate solution analyzed in Example 1. A total of 3.2 grams of calcium hydroxide was added. A reaction time of thirty minutes was allowed keeping the temperature in the range of 90–95 deg C. Water was added as required to maintain a constant volume. At 30 minutes, an additional 0.4 grams were added to account for any lime conversion to calcium carbonate. An additional 10 minutes reaction time at 90–95 deg C. were allowed prior to hot filtration. Water was added as necessary to maintain a constant volume. The insoluble residue was separated from the reaction slurry by filtration, recovering a dilute filtrate of soluble cesium sulfate and cesium hydroxide. The pH of the 220 ml of recovered filtrate was 12.92 at room temperature.

It was quite evident that the filtration residue weight from this high temperature liming trial was considerably less than that of the lower temperature trial in Example 5A, indicating significantly less conversion of alkali sulfate to hydroxide at the higher reaction temperature.

Added to this filtrate were 1.3 grams of potassium carbonate, a soluble carbonate source intended to precipitate impurities like soluble calcium sulfate as insoluble calcium carbonate at the elevated pH. The 1.3 grams added were believed to be in excess of that which was required to precipitate the relevant impurities. The resultant cloudy solution was then filtered to separate the residue comprising at least calcium carbonate from the purified filtrate. A total of 212 ml of filtrate was recovered.

The 212 ml of recovered filtrate was then neutralized with sulfuric acid to a neutral pH. There was no precipitate. Since excess potassium carbonate was added, any calculated conversion from alkali sulfate to hydroxide and then back to sulfate would be inaccurate since the excess potassium carbonate would also be neutralized to a sulfate. Example 5C below is intended to depict the conversion percentage as no potassium carbonate was added prior to sulfuric acid neutralization. Including the g/l cesium, the notable non-alkali soluble impurities at greater than or equal to 1 ppm are depicted as follows:
51 g/l cesium
1 ppm of calcium
3 ppm of silicon
2 ppm of boron Example 5C Calcium hydroxide was added to 250 ml of 90–95 deg C. stock cesium sulfate solution analyzed in Example 1. A total of 3.2 grams of calcium hydroxide was added. A reaction time of thirty minutes was allowed keeping the temperature in the range of 90–95 deg C. Water was added as required to maintain a constant volume. The insoluble residue was then removed from the 90–95 deg C. reaction slurry by filtration, recovering a dilute filtrate of soluble cesium sulfate and cesium hydroxide. The pH of the 215 ml of recovered filtrate was 12.87 at room temperature.

It was quite evident that the filtration residue weight from this high temperature liming trial was considerably less than that of the lower temperature trial in Example 5A, indicating significantly less conversion of alkali sulfate to hydroxide at the higher reaction temperature.

A volume of 195 ml of recovered filtrate was then neutralized using 0.2 ml of sulfuric acid. Again, there was no precipitate upon neutralization. The addition of sulfuric (not formic) acid was consistent with 1716 ppm of alkali sulfate having been converted first to hydroxide and then to sulfate when neutralized.

There was no addition of potassium carbonate to ensure that the degree of conversion cited was accurate and not impacted by any excess free potassium carbonate in solution. This is analogous to what was done in step one of Examples 4A and 4B. Additionally, Example 5A above can be regarded as accurate since a slight deficiency of potassium carbonate was added to precipitate all of the relevant impurities, as evidenced by the resultant chemical purity levels.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making a cesium salt comprising:
    a) reacting a cesium sulfate containing solution with lime to form 1) a solution comprising at least cesium hydroxide and 2) a residue comprising calcium sulfate;
    b) removing the residue from the solution; and
    c) converting the cesium hydroxide in said solution to at least one cesium salt.

2. The method of claim 1, further comprising repeating steps a) through c) one or more times with the solution resulting each time in step c).

3. The method of claim 1, further comprising repeating steps a) through c) until substantially no cesium sulfate is present in said solution resulting in step c).

4. The method of claim 1, wherein said step of converting comprises adding at least one acid to said solution.

5. The method of claim 4, wherein said acid is formic acid.

6. The method of claim 4, wherein said acid is acetic, citric, hydrochloric, hydrobromic, hydroiodic, nitric, butyric, propionic, oxalic, salicylic, or combinations thereof.

7. The method of claim 4, wherein said acid is present in an amount sufficient to convert substantially all of the cesium hydroxide into a cesium salt.

8. The method of claim 4, wherein the amount of acid used is sufficient to neutralize said solution.

9. The method of claim 1, wherein said cesium sulfate containing solution is at a temperature of from about 0° C. to about 100° C.

10. The method of claim 1, wherein said cesium sulfate containing solution is at a temperature of from about 0° C. to about 50° C.

11. The method of claim 1, wherein said cesium sulfate containing solution is at a temperature of from about 0° C. to about 30° C.

12. The method of claim 1, wherein the cesium sulfate containing solution contains from about 1% by weight to about 50% by weight cesium sulfate that is soluble in said solution.

13. The method of claim 12, wherein said cesium sulfate containing solution contains from about 1% by weight to about 10% by weight cesium sulfate that is soluble in the solution.

14. The method of claim 12, wherein the cesium sulfate containing solution contains from about 5% by weight cesium sulfate that is soluble in said solution.

15. The method of claim 1, wherein from about 8% to about 25% by weight of the cesium hydroxide is formed and present in said solution of step b) wherein the weight % is based on the originally contained cesium sulfate in the solution.

16. The method of claim 1, wherein the pH of the solution in step b) is from about 12.5 to about 13.5, when measured at room temperature.

17. The method of claim 1, wherein said lime is slaked lime, hydrated lime, or both.

18. The method of claim 1, wherein said lime is calcium oxide.

19. The method of claim 1, wherein said solution comprising at least cesium hydroxide further comprises cesium salts other than cesium hydroxide.

20. The method of claim 19, wherein said cesium salts are selected from cesium sulfate, cesium formate, or combinations thereof.

21. The method of claim 1, wherein said residue further comprises magnesium hydroxide, excess calcium hydroxide, metal impurities, or combinations thereof.

22. The method of claim 1, further comprising adding at least one soluble carbonate source to the solution from step b, to precipitate impurities, and removing said impurities before proceeding with step c.

23. The method of claim 22, wherein the soluble carbonate source comprises carbon dioxide, carbonates, and/or bicarbonates of cesium, rubidium, potassium, sodium, or lithium, or combinations thereof.

24. A method of making cesium formate comprising:
   a) reacting a cesium sulfate containing solution with lime to form 1) a solution comprising at least cesium hydroxide and 2) a residue comprising calcium sulfate;
   b) removing the residue from the solution; and
   c) adding formic acid to said solution from step b) to form cesium formate.

25. The method of claim 24, further comprising repeating steps a) through c) one or more times with the solution resulting each time in step c).

26. A method of making cesium hydroxide comprising:
   a) reacting a cesium sulfate containing solution with lime to form 1) a solution comprising at least cesium hydroxide and 2) a residue comprising calcium sulfate; and
   b) removing the residue from the solution.

27. A method of making an alkali metal salt comprising:
   a) reacting an alkali metal sulfate containing solution with lime to form 1) a solution comprising at least alkali metal hydroxide and 2) a residue comprising calcium sulfate;
   b) removing the residue from the solution; and
   c) converting the alkali metal hydroxide in the solution comprising at least alkali metal hydroxide to at least one alkali metal salt and repeating steps a) through a) one or more times with the solution resulting each time in step c).

28. The method of claim 27, further comprising repeating steps a) through c) until substantially no alkali metal sulfate is present in said solution resulting in step c).

29. The method of claim 27, wherein said step of converting comprises adding at least one acid to said solution.

30. The method of claim 29, wherein said acid is formic acid.

31. The method of claim 29, wherein said acid is present in an amount sufficient to convert substantially all of the alkali metal hydroxide into an alkali metal salt.

32. The method of claim 29, wherein the amount of acid used is sufficient to neutralize said solution.

33. The method of claim 27, wherein said alkali metal sulfate containing solution is at a temperature of from about 0° C. to about 100° C.

34. The method of claim 27, further comprising adding at least one soluble carbonate source to the solution from step b, to precipitate impurities, and removing said impurities before proceeding with step c.

35. The method of claim 34, wherein the soluble carbonate source comprises carbon dioxide, carbonates, and/or bicarbonates of cesium, rubidium, potassium, sodium, or lithium, or combinations thereof.

36. A method of making an alkali metal salt comprising:
   a) reacting an alkali metal sulfate containing solution with lime to form 1) a solution comprising at least alkali metal hydroxide and 2) a residue comprising calcium sulfate;
   b) removing the residue from the solution; and
   c) converting the alkali metal hydroxide in the solution comprising at least alkali metal hydroxide to at least one alkali metal salt, wherein said step of converting comprises adding at least one acid to said solution, and wherein said acid is acetic, citric, hydrochloric, hydrobromic, hydroiodic, nitric, butyric, propionic, oxalic, salicylic, or combinations thereof.

37. A method of purifying cesium sulfate comprising:
   a) reacting a cesium sulfate containing solution with lime to form 1) a solution comprising at least cesium hydroxide and 2) a residue comprising calcium sulfate;
   b) removing the residue from the solution; and
   c) converting the cesium hydroxide in the solution comprising at least cesium hydroxide to cesium sulfate, wherein said cesium sulfate in step c) has a higher purity than said cesium sulfate in step a).

38. The method of claim 37, wherein said converting the cesium hydroxide in said solution to cesium sulfate is accomplished by adding a sufficient amount of sulfuric acid to convert said cesium hydroxide to cesium sulfate.

39. The method of claim 37, further comprising adding at least one soluble carbonate source to the solution from step b, to precipitate impurities, and removing said impurities before proceeding with step c.

40. The method of claim 39, wherein the soluble carbonate source comprises carbon dioxide, carbonates, and/or bicarbonates of cesium, rubidium, potassium, sodium, or lithium, or combinations thereof.

41. A method of purifying alkali metal sulfate comprising:
a) reacting an alkali metal sulfate containing solution with lime to form 1) a solution comprising at least alkali metal hydroxide and 2) a residue comprising calcium sulfate;
b) removing the residue from the solution; and
c) converting the alkali metal hydroxide in said solution to alkali metal sulfate, wherein said alkali metal sulfate in step c) has a higher purity than said alkali metal sulfate in step a), and said method further comprising adding at least one soluble carbonate source to the solution from step b), to precipitate impurities, and removing said impurities before proceeding with step c).

42. The method of claim 41, wherein said converting the alkali metal hydroxide in said solution to alkali metal sulfate is accomplished by adding a sufficient amount of sulfuric acid to convert said alkali metal hydroxide to alkali metal sulfate.

43. The method of claim 41, wherein the soluble carbonate source comprises carbon dioxide, carbonates, and/or bicarbonates of cesium, rubidium, potassium, sodium or lithium, or combinations thereof.

* * * * *